United States Patent [19]

Tateisi et al.

[11] Patent Number: 4,562,340

[45] Date of Patent: Dec. 31, 1985

[54] TERMINAL DEVICE FOR MAKING PAYMENTS FOR CREDIT TRANSACTIONS

[75] Inventors: Kazuma Tateisi, Ukyo; Yoshitsugu Shinohara, Shiga, both of Japan

[73] Assignee: Omron Tateisi Electronics Co., Kyoto, Japan

[21] Appl. No.: 543,012

[22] Filed: Oct. 18, 1983

[30] Foreign Application Priority Data

Oct. 19, 1982 [JP] Japan .................................. 57-183883

[51] Int. Cl.$^4$ ............................................. G06F 15/30
[52] U.S. Cl. ..................................... 235/379; 235/380
[58] Field of Search .................. 235/379, 380; 364/900

[56] References Cited

U.S. PATENT DOCUMENTS 4,277,837  7/1981  Stuckert ............................. 235/379
4,314,352  2/1982  Fought ............................... 235/379

*Primary Examiner*—Harold I. Pitts
*Attorney, Agent, or Firm*—Stevens, Davis, Miller & Mosher

[57] ABSTRACT

A terminal device for making payments for credit transactions is connected to and adapted to communicate with a control center which includes a memory having stored therein data relating to a plurality of users of credit cards and to a deposit account of at least one credit company, the control center having the function of transferring a specified sum payable from an account of each user to the account of the credit company. The terminal device comprises a card reader for reading data from either a credit card or a bank card, the credit card having recorded therein data relating at least to the account number of the credit company and data relating to the holder of the card, the bank card having recorded therein data relating at least to an account number of its holder and data for identifying the holder; input means for entering sum payable; a display for showing at least the entered sum payable; a unit for transmitting to the control center at least the entered sum payable the data read by the card reader and relating to the account number of the credit company, such as the company code thereof, and the data read by the card reader and relating to the account number of the holder of the bank card; and a recorder for recording data as to transfer processing on receiving from the control center a message indicating completion of the transfer processing.

7 Claims, 11 Drawing Figures

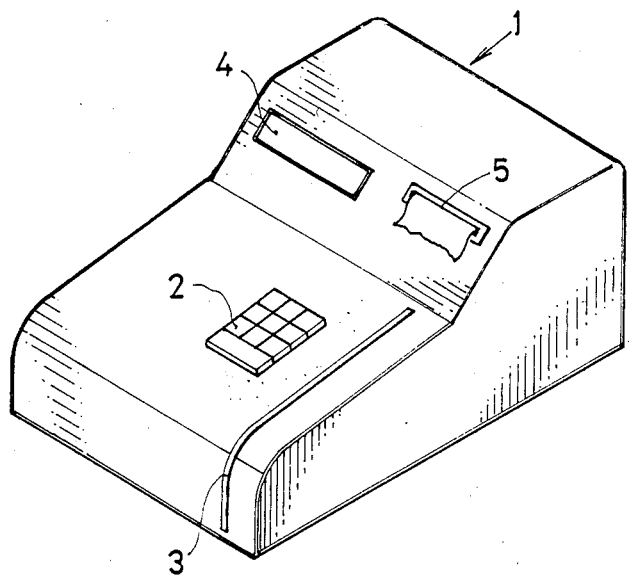

TERMINAL DEVICE FOR MAKING PAYMENTS FOR CREDIT TRANSACTIONS

BACKGROUND OF THE INVENTION

The present invention relates to a terminal device for executing credit transactions, and more particularly to a terminal device for making payments for transactions performed with use of credit cards issued by credit companies.

Transactions with use of a credit card are characterized in that the credit company issuing the credit card gives credit to the user of the card. The credit company makes a payment to a store or the like for the transaction conducted by the user, who in turn makes a payment to the credit company for the transaction. This payment is made, for example, by directly transferring the sum payable from a deposit account of the user to an account of the credit company, or using a check. In either case, such payments are made periodically, e.g., monthly, so that much labor is required for a large amount of clerical work for handling the payments at the bank and credit company concerned.

SUMMARY OF THE INVENTION

The main object of the present invention is to provide a terminal device for making payments for credit transactions wherein credit cards are used so that the user of the credit card can make payments automatically to reduce the amount of clerical work for handling the payments.

The terminal device of the present invention for making payments for credit transactions is connected to and communicates with a control center including a memory having stored therein data as to a plurality of users of credit cards and a deposit account of at least one credit company, the control center having the function of transferring a specified sum payable from an account of each user to the account of the credit company. The terminal device comprises a card reader for reading data from the credit card and a bank card, the credit card having recorded therein data relating at least to the account number of the credit company and data relating to the holder of the card, the bank card having recorded therein data relating at least to an account number of its holder and data for identifying the holder; input means for entering sums payable; a display for showing at least the sum payable and entered; means for transmitting to the control center at least the sum payable and entered, the data read by the card reader and relating to the account number of the credit company, such as the company code thereof, and the data read by the card reader and relating to the account number of the holder of the bank card; and a recorder for recording data as to transfer processing on receiving from the control center a message indicating completion of the transfer processing.

The user himself of the credit card uses the terminal device. When the user inserts his credit card and bank card into the terminal device, various items of data recorded in the cards are read. The user also enters the sum payable. The data read from the cards and relating at least to the account of the credit company, such as the company code thereof, and to the account of the user, and the sum payable and entered are transmitted to the control center. Based on the data, the control center performs a process for withdrawing the sum from the account of the user and transferring the sum to the account of the credit company. The data relating to the transfer process is sent to the terminal unit, in which the data is recorded, for example, on a receipt by printing. In this way, the user himself of the credit card operates the terminal device to automatically pay the sum due. This almost entirely eliminates the clerical work needed at the bank concerned and the credit company for the payment, achieving savings in labor. Further because the credit card is used for entering the data as to the account number of the credit company, such as the company code thereof, i.e., the data relating to the account to which the payment is to be transferred, the account can be designated reliably to assure payment free of error.

BRIEF DESCRIPTION OF THE DRAWINGS

FIG. 1 is a perspective view showing a terminal device for making payments for credit transactions;
FIG. 2 shows a credit card;
FIG. 3 shows a bank card.

DESCRIPTION OF THE PREFERRED EMBODIMENTS

Figure 4:
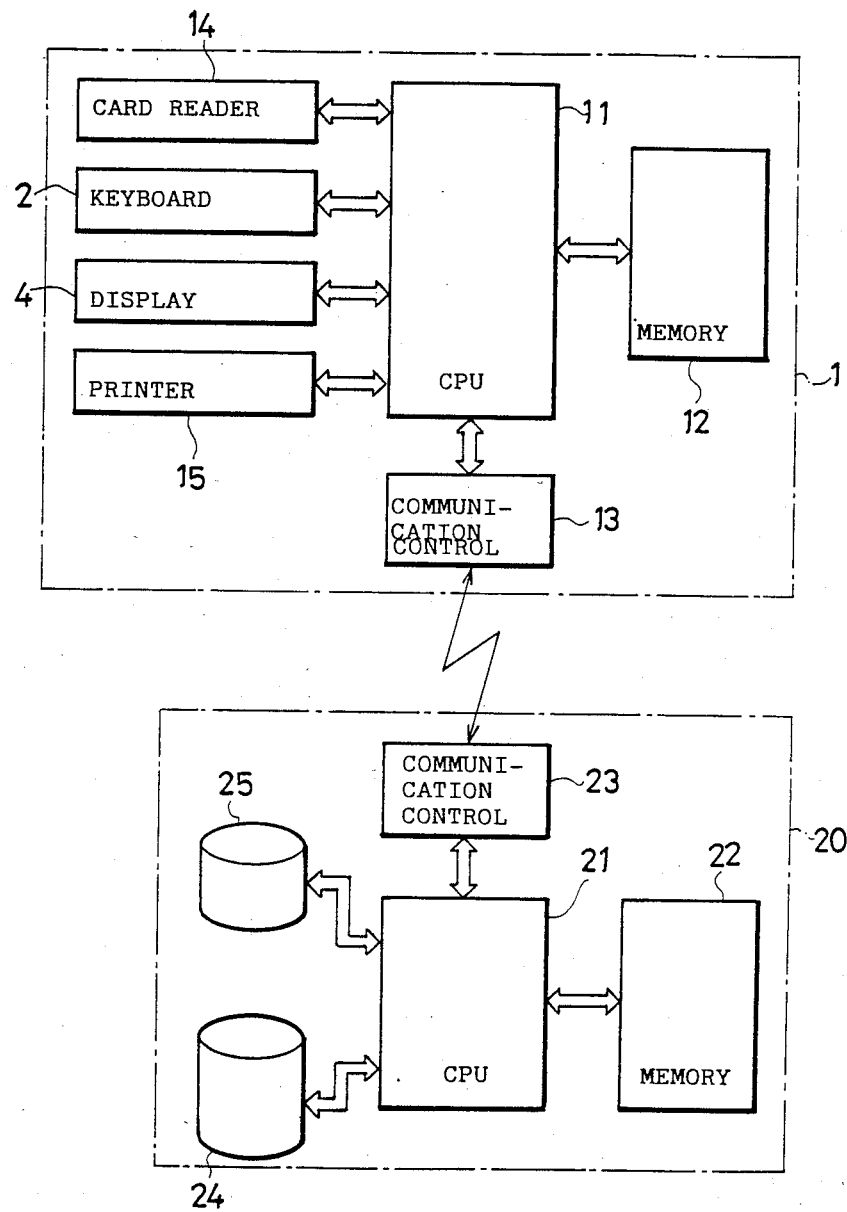
FIG. 4 is a block diagram showing a payment system for credit transactions.

FIG. 1 shows the appearance of a terminal device 1 for making payments for credit transactions. The terminal device 1 has a keyboard 2 including a ten-key arrangement for entering sums payable, secret numbers specific to customers, etc., a manual scanning groove 3 for credit cards and bank cards, a display 4 for showing the sums keyed in and other information, and an outlet 5 for delivering receipts having transfer data printed thereon.

FIG. 2 shows the credit card CC, and FIG. 3 shows the bank card BC. Each of these cards CC and BC has a magnetic stripe 9 affixed thereto. The credit card CC is issued by a credit company to a credit customer accepted by the company. The stripe 9 on the card CC has magnetically recorded therein a company code representing the credit company issuing the card, a customer number representing the customer possessing the card and other data. The bank card is issued by a bank to a person having an account with the bank. The stripe 9 on the bank card BC has magnetically recorded therein a bank number representing the bank issuing the card, a number representing the branch where the card holder has a deposit account, the account number and secret number of the holder, the number of a control center with which the terminal device communicates, and other data.

FIG. 4 shows a payment system for credit transactions in its entirety. The system comprises the terminal device 1 and the control center 20 which are interconnected by communication lines. The terminal device 1 is installed in the home of the customer, a branch of the bank or some other suitable location. The terminal device 1 is controlled by a central processing unit (CPU), such as a microprocessor, 11 having a memory 12. The CPU 11 has connected thereto a communication control unit 13 for communication with the center 20, a card reader 14 for reading the magnetically recorded data in the credit card CC and the bank card BC, the above-mentioned keyboard 2 and display 4, and a printer 15 for printing transfer data on receipts and a journal. The communication control unit 13 includes an automatic dial circuit and a modem. The automatic dial function can be dispensed with when the terminal device 1 is so connected to the control center 20 as to be in condition for communication therewith at all times. Although the card reader 14 of the present embodiment is of the manual scanning type, an automatic scanning reader is of course usable. In this case, the terminal unit 1 is provided with a card insertion inlet in place of the scanning groove 3 (FIG. 1).

The control center 20 has a large-sized CPU 21, which controls the communication between the center and terminal devices and executes various transaction processes including a transfer process. The CPU 21 is provided with a memory 22 for storing the program to be executed by the CPU and data necessary for the transaction processes, a communication control unit 23 for communication with the terminal devices, a customer information file (CIF) 24, and a transaction record file 25.

Figure 5:
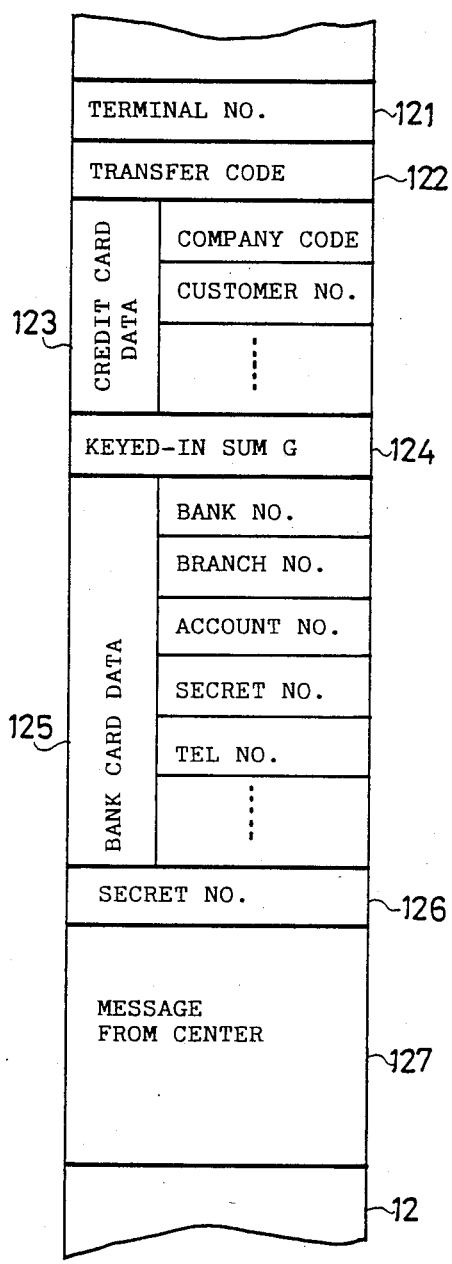
FIG. 5 shows the contents of a memory in the terminal device.

The memory 12 of the terminal device 1 also stores the program to be executed by the CPU 11 and has areas for storing data necessary for processing payments. FIG. 5 shows some of the data areas. The memory 12 has respectively stored in areas 121 and 122 a terminal number for identifying a particular terminal device and a transfer code to be compiled into the message to be sent to the control center 20. If the memory 12 has recorded therein the telephone number of the control center 20, the bank card BC need not have the telephone number recorded therein. The memory 12 has areas 123 and 125 for respectively storing the data read from the credit card CC and the data read from the bank card BC, areas 124 and 126 for respectively storing the sum G payable and secret number keyed in, and an area 127 for storing the message sent from the center 20.

Figure 6:
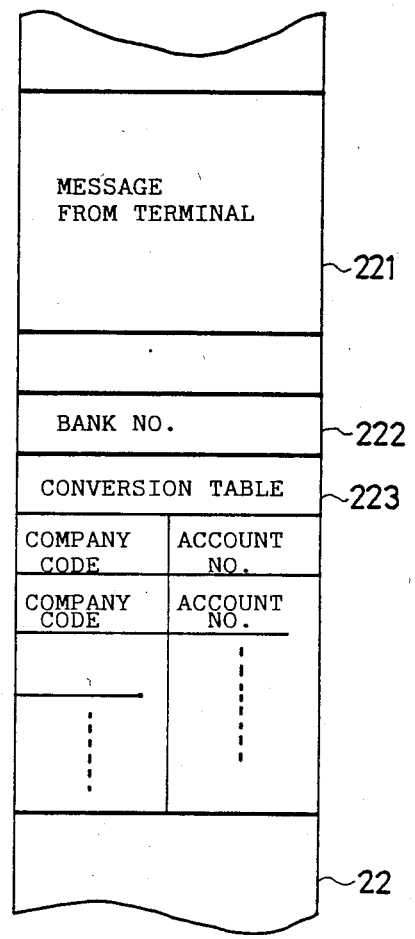
FIG. 6 shows the contents of a memory in a control center.

FIG. 6 shows part of the memory 22 included in the center 20. The memory 22 has an area 222 having stored therein the number of the bank concerned. The memory 22 further has an area 221 for storing the message sent from the terminal device 1, and an area 223 for storing a company code/account number conversion table. The conversion table is used for searching for the account number of a particular credit company having an account with the bank, with reference to the company code of the credit company. The conversion table can be dispensed with when the account number of the credit company is recorded in the credit card CC in place of or in addition to the company code, with the terminal device 1 adapted to transmit the account number to the control center 20.

Figure 7:
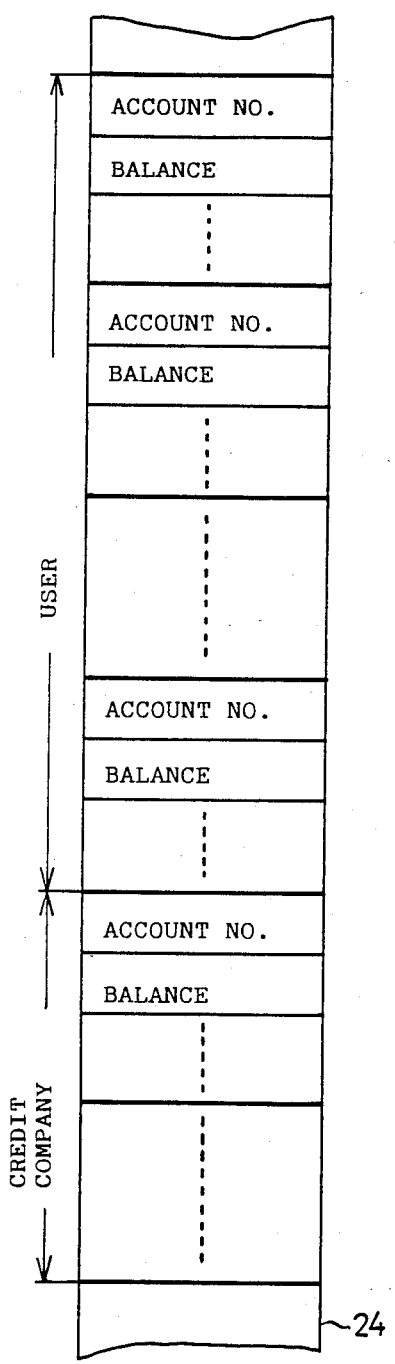
FIG. 7 shows the contents of a customer information file.
Figure 8:
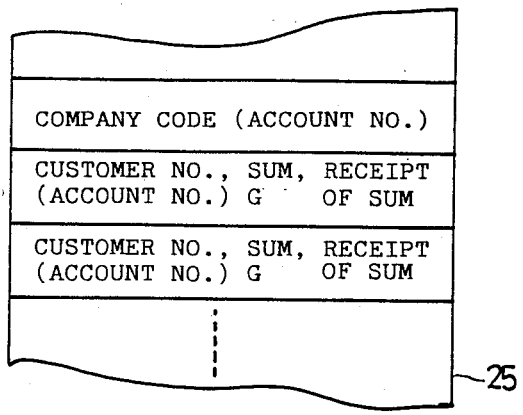
FIG. 8 shows the contents of a transaction record file.

FIG. 7 shows part of the CIF 24 having stored therein transaction data relating to the customers and credit companies having an account with the bank, in respect of the deposit balance, name, address, etc. for each account number. The transaction record file 25 is adapted to store data as to all transaction processes executed by the center 20. In connection with payment processing, the file stores for each credit company code (account number) the customer numbers of all the customers who paid to the credit company, paid sums G and designation of the service (receipt of money) as seen in FIG. 8. The data shows each credit company the payments made by the individual customers. Such data relating to payments may be stored in the CIF 24 for each credit company.

Figure 9:
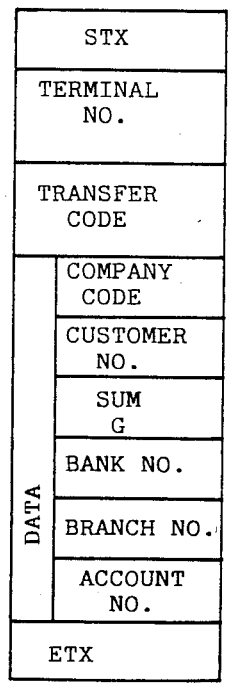
FIG. 9 shows a format of the message to be transmitted.

FIG. 9 shows an example of format of the message to be sent from the terminal device to the control center 20. The message comprises start of text (STX), the number of the terminal device sending the message, a code designating transfer service, the company code and customer number read from the credit card CC, the sum of payment G keyed in, the bank number, branch number and account number read from the bank card BC, and end of text (ETX).

The user of the credit card receives periodically, e.g., monthly, from the credit company a debit note stating the sum payable for the transactions performed within the period concerned with use of the card. The user makes the payment of the sum by the terminal device 1 using the credit card and the bank card. It is herein prerequisite that the credit company have an account with the bank where the user has an account.

Figure 10:
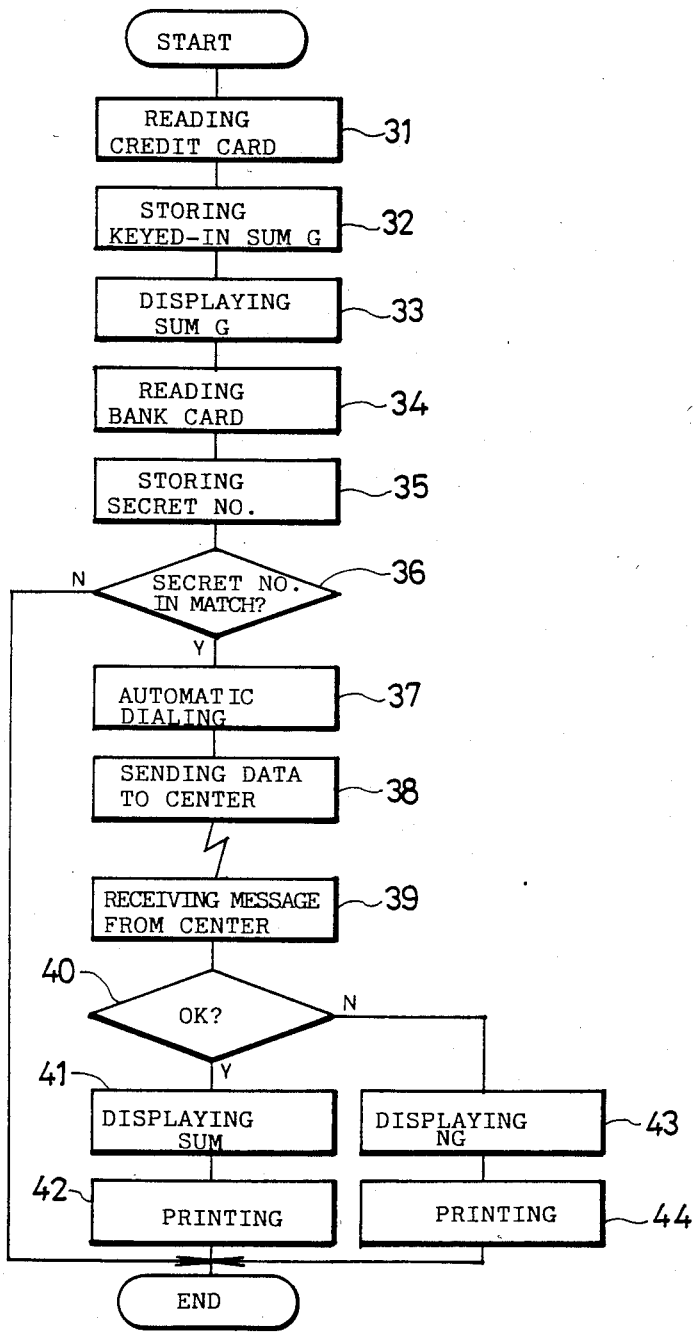
FIG. 10 is a flow chart showing a processing procedure for the terminal device.

FIG. 10 shows the processing procedure to be followed by the terminal device 1. When the user moves his credit card along the scanning groove 3, the card data is read by the reader 14 and stored in the area 123 of the memory 12 (step 31). With reference to the data read out, the credit card is checked as to whether it is effective (not shown). This checking is done based on a code (not shown in FIG. 2 but recorded in the magnetic stripe) indicating that the card is a credit card, card data format, etc. If the credit card scanned is found not effective, the result is shown on the display, and the subsequent logic sequence will not proceed.

Next, the user enters the sum to be paid, G, by the keyboard 2, whereupon the sum is stored in the area 124 of the memory 12 (step 32) and displayed on the display 4 (step 33). The bank card is similarly moved for scanning, whereby the bank card data is read and stored in the area 125 of the memory 12 (step 34). With reference to the data, the bank card is also checked for effectiveness. The user further enters the secret number with use of the keyboard 2, whereupon the number is stored in the area 126 of the memory 12 (step 35). The keyed-in secret number may be shown on the display 4. The keyed-in secret number is then checked as to whether it is in match with the secret number read from the bank card (step 36). If the two numbers are not in match, the process is immediately terminated. The device may of course be adapted to accept the keyed-in secret number more than once (e.g. twice). The CIF 24 of the center 20 may have stored therein, along with the account number, the secret number to be compared with the keyed-in secret number. In this case, the keyed-in secret number is transmitted to the center 20 along with the transaction data and checked at the center 20.

When the two secret numbers are in match, all data for processing the payment is available. The communication control unit 13 then automatically dials the center 20 to connect the line between the device 1 and the center 20 (step 37). A message such as the one shown in FIG. 9 is edited with use of the data in the memory 12 and sent to the center 20 (step 38). Instead of automatic dialing, the customer may manipulate the keyboard 2 for (push-button) dialing for data transmission, with reference to the display showing readiness for data transmission after all data has become available. Further alternatively, an automatic dial key may be provided for instructing start of automatic dialing, such that the key is manipulated for automatic dialing. Furthermore, a telephone may be used for communication with the clerk at the center to start data transmission or to answer inquiries after the data transmission.

Figure 11:
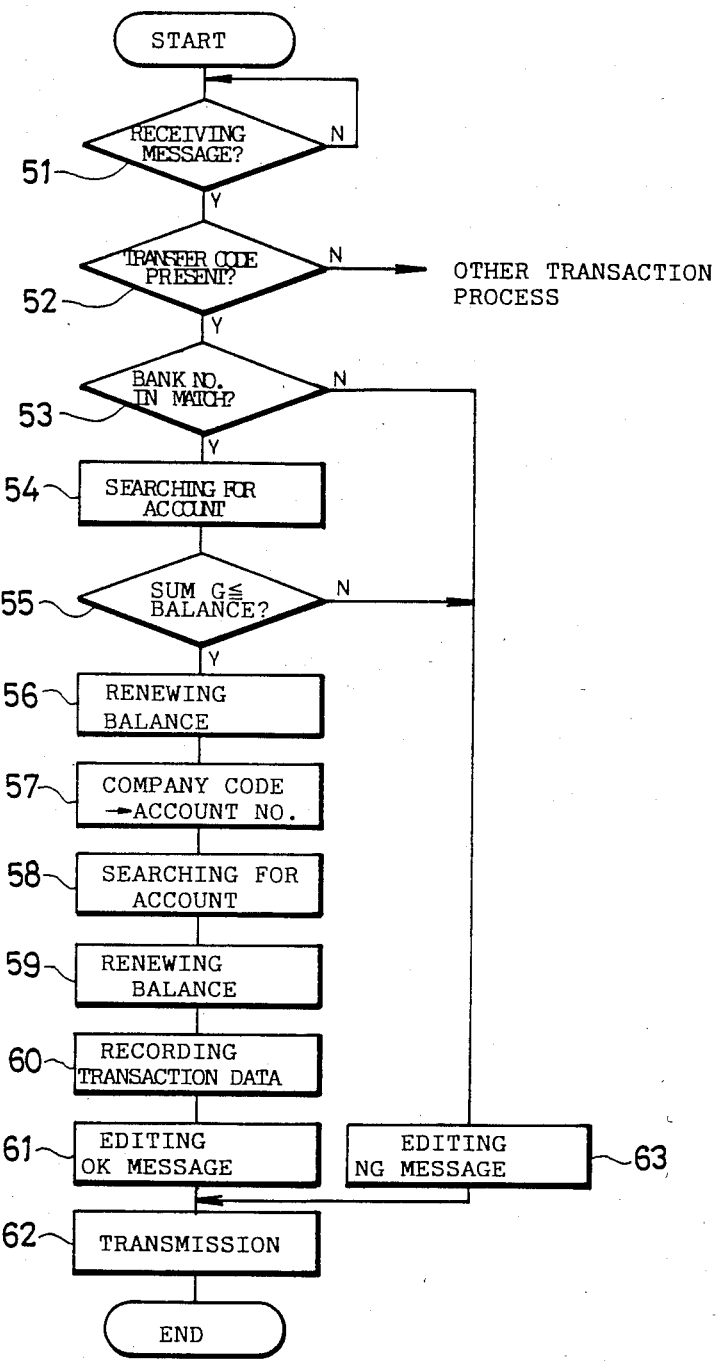
FIG. 11 is a flow chart showing a processing procedure for the control center.

FIG. 11 shows the processing procedure to be followed by the center 20. When the message from the terminal device 1 is received (step 51), the message is stored in the area 221 of the memory 22 and checked as to whether it contains a transfer code (step 52). When the transfer code is present, step 53 follows. The absence of the code indicates that the message is intended for some other transaction, so that the process specified by the message is executed (not shown).

Step 53 checks whether the bank number in the message is in match with the bank number stored in the area 222 of the memory 2. The company code in the message may also be checked as to whether it is in match with the company code on the conversion table within the memory 22. When the bank numbers are in match, the CIF 24 is searched for the account number in match with the account number in the message (step 54). Subsequently, the balance on the account concerned is read and compared with the sum G payable and given in the message (step 55). The sum G is withdrawable if it is not larger than the balance. In this case, the sum G is subtracted from the balance, and the result of subtraction is stored on the corresponding account of the CIF 24 as a renewed balance (step 56).

Next, the account number of the credit company corresponding to the company code in the message is identified with reference to the conversion table (step 57), and the CIF 24 is searched for the account number (step 58). The sum G is added to the balance on the account of the credit company. Thus the balance of the account is renewed as the result of the addition (step 59). In this way, the sum G withdrawn from the account of the user is transferred to the account of the credit company. The data relating to the payment process is recorded in the transaction record file 25 (step 60).

Finally, an OK message is edited which states that the payment is completed and contains the data relating to the process (i.e. the data contained in the message of FIG. 9) (step 61). The message is sent to the terminal device concerned (step 62).

When the bank numbers are found to be out of match in step 53, when the account number of the credit company is absent, when the account of the user is found absent in step 54, and when the balance is found smaller than the sum G in step 55, an NG meassage stating such a finding is edited (step 63) and sent to the terminal device.

When the terminal device 1 receives a message from the center 20 in step 30 of FIG. 10, the message is checked as to whether it is an OK message or NG message (step 40). If it is an OK message, the transferred sum G is shown on the display 4 (step 41), and transaction data including date, sum G, name of the credit company receiving the sum, name of the bank, account number of the user, etc. is printed on a receipt and journal by the printer 15 (step 42), and the receipt is issued. If the message is an NG message, the display 4 shows the result and when needed, the reason therefor, and such information is printed on a receipt and journal (steps 43 and 44).

Although the foregoing embodiment is a payment processing system at one bank, it is also possible to make payments between two banks; for example, a customer having an account with a bank can make payments to a credit company having an account with another bank. In this case, the control centers of the banks are interconnected by a communication line for transmitting transaction data from one center to the other center.

What is claimed is:

1. A terminal device for making payments for credit transactions which is connected to and adapted to communicate with a control center including a memory having stored therein data as to a plurality of users and as to a deposit account of at least one credit company, the control center having the function of transferring a specified sum payable from an account of the user to the account of the credit company, the terminal device comprising:
   a card reader for reading data from a credit card and a bank card, the credit card having recorded therein data relating at least to the account number of the credit company and data relating to the holder of the card, the bank card having recorded therein data relating at least to the account number of its holder and data for identifying the holder,
   input means for entering a sum payable,
   a display for showing at least the entered sum payable,
   means for transmitting to the control center at least the entered sum payable, the data read by the card reader and relating to the account number of the credit company and the data read by the card reader and relating to the account number of the holder of the bank card, and a recorder for recording data as to transfer processing upon receiving from the control center a message indicating completion of the transfer processing.

2. A terminal device as defined in claim 1 wherein the data relating to the account number of the credit company is a credit company code.

3. A terminal device as defined in claim 1 which further comprises means for entering data for identifying the holder of the bank card, and means for checking whether the holder identifying data read from the bank card bears a predetermined relationship with the identifying data entered by the entering means 4. A terminal device as defined in claim 3 wherein input means for entering sums payable and the means for entering the data for identifying the holder of the bank card are a keyboard.

5. A system for making payments for credit transactions comprising a control center including a memory having stored therein data relating to a plurality of users and to a deposit account of at least one credit company, and a terminal device connected to the control center, the terminal device comprising:
   a card reader for reading data from a credit card and a bank card, the credit card having recorded therein data relating at least to the account number of the credit company and data relating to the holder of the card, the bank card having recorded therein data relating at least to the account number of its holder and data for identifying the holder,
   input means for entering sum payable,
   a display for showing at least the entered sum payable, communication means for sending to the control center at least the entered sum payable, the data read by the card reader and relating to the account number of the credit company and the data read by the card reader and relating to the account number of the holder of the bank card and for receiving messages from the control center, and a recorder for recording data relating to transfer processing upon receiving from the control center a message indicating completion of the transfer processing, the control center comprising:

communication means for receiving from the terminal device messages containing data relating to payments and for sending to the terminal device messages relating to payments, and means for transferring the sum payable from the account of the user to the account of the credit company in the memory, based on the message received from the terminal device and containing payment relating data.

6. A system as defined in claim 5 wherein the data relating to the account number of the credit company is a credit company code, and the control center is provided with a table for converting the code to the account number of the credit company.

7. A method for sending payment transaction data to a central station from a remote station comprising, at a remote station, the steps of:

reading from a credit card data relating at least to the account number of a credit company, and to the credit card holder;

reading from a bank card data relating at least to an account number of the bank card holder;

storing a sum payable; and transmitting to the central station at least the stored sum payable, data relating to the account number of the credit company, and data relating to the account number of the bank card holder.

* * * * *